United States Patent
Xu et al.

(12) 
(10) Patent No.: US 11,181,353 B2
(45) Date of Patent: Nov. 23, 2021

(54) WHEEL BRAKE SPACE DETECTING DEVICE

(71) Applicant: CITIC Dicastal CO., LTD, Qinhuangdao (CN)

(72) Inventors: Zuo Xu, Qinhuangdao (CN); Weidong Liu, Qinhuangdao (CN); Xiaoying Ma, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 388 days.

(21) Appl. No.: 16/407,723

(22) Filed: May 9, 2019

(65) Prior Publication Data

US 2020/0141710 A1 May 7, 2020

(30) Foreign Application Priority Data

Nov. 2, 2018 (CN) .......................... 201811298022.5

(51) Int. Cl.
   *G01B 5/20* (2006.01)
   *G01B 3/12* (2006.01)
(52) U.S. Cl.
   CPC ...................................... *G01B 3/12* (2013.01)
(58) Field of Classification Search
   CPC .................................................. G01B 5/0025

USPC ............................................... 33/203.12, 203
See application file for complete search history.

(56) References Cited

U.S. PATENT DOCUMENTS

| 10,436,568 B2 * | 10/2019 | Liu .................. G01B 5/207 |
| 11,047,668 B2 * | 6/2021 | Xu .................. G01M 17/013 |
| 11,084,057 B2 * | 8/2021 | Xu .................. B05B 12/32 |
| 2018/0149471 A1 | 5/2018 | Lu et al. |
| 2020/0141725 A1 * | 5/2020 | Liu .................. G01M 17/013 |

FOREIGN PATENT DOCUMENTS

| CN | 108705355 A | 10/2018 |
| CN | 108714500 A | 10/2018 |

* cited by examiner

*Primary Examiner* — George B Bennett
(74) *Attorney, Agent, or Firm* — Calfee, Halter & Griswold LLP

(57) ABSTRACT

The present application discloses a wheel brake space detecting device comprising a frame, a first servo motor, a connecting shaft, a pedestal, a rotating shaft, a rotary cylinder, a first bearing, a first bearing end cap, a base, a second bearing, a second bearing end cap, a shaft, a shaft sleeve, contacts, a spring, linear bearings, a synchronous cam, a probe, a probe holder, a first sliding frame, a first lead screw nut, a first guide rail sliding seat, a first linear guide rail, a first ball screw, a second servo motor, a suspension, a second linear guide rail, a second guide rail sliding seat, a second lead screw nut, a second ball screw, a third servo motor, and a second sliding frame.

4 Claims, 2 Drawing Sheets

WHEEL BRAKE SPACE DETECTING DEVICE

CROSS-REFERENCE TO RELATED APPLICATIONS

This application claims priority to Chinese Patent Application No. 201811298022.5, filed on Nov. 2, 2018, which is hereby incorporated by reference in its entirety.

TECHNICAL FIELD

The present application relates to a space detecting device, specifically to a device for automatically detecting a wheel brake space with high precision after machining of a wheel.

BACKGROUND ART

The wheel is an exterior part of a vehicle and is one of important safety parts. The brake system of the wheel is mounted in an inner wheel rim, that is, in the brake space of the wheel. Therefore, the brake space of the wheel is an important parameter affecting the assembly of the wheel. In a wheel manufacturer, whether the brake space is qualified is usually detected by a detection plate matching the brake space of the wheel. Such detection methods have the problems of low efficiency and poor detection effect, and cannot meet the needs of automated production.

SUMMARY OF THE INVENTION

The objective of the present application is to provide a wheel brake space detecting device.

In order to achieve the above objective, the technical solution of the present application is: a wheel brake space detecting device, comprising a frame, a first servo motor, a connecting shaft, a pedestal, a rotating shaft, a rotary cylinder, a first bearing, a first bearing end cap, a base, a second bearing, a second bearing end cap, a shaft, a shaft sleeve, contacts, a spring, linear bearings, a synchronous cam, a probe, a probe holder, a first sliding frame, a first lead screw nut, a first guide rail sliding seat, a first linear guide rail, a first ball screw, a second servo motor, a suspension, a second linear guide rail, a second guide rail sliding seat, a second lead screw nut, a second ball screw, a third servo motor, and a second sliding frame.

The first servo motor and the pedestal are mounted on the frame; the rotating shaft is connected to an output shaft of the first servo motor through the connecting shaft; the rotary cylinder, the shaft sleeve and the base are mounted on the rotating shaft; the second bearing end cap encloses the second bearing and the shaft in the base, and two ends of the shaft are respectively connected with an output shaft of the rotary cylinder and the synchronous cam; the three or more linear bearings are mounted on the side wall of the shaft sleeve in a uniformly distributed way; the side wall of the synchronous cam has three or more uniform-distributed cambered surfaces; the outer ends of the three or more contacts respectively pass through the spring and the linear bearings, and the inner ends are respectively connected with the same amount of corresponding cambered surfaces of the high-precision synchronous cam; two ends of the spring are respectively in contact with the linear bearings and the shaft end surfaces of the contacts; the spring always has elasticity, so that the inner ends of the contacts always compress the synchronous cam; and the rotating shaft is mounted on the pedestal through the first bearing and the first bearing end cap.

The first servo motor drives the rotating shaft to rotate with high precision through the first bearing.

The rotary cylinder, through the second bearing and the shaft, may drive the synchronous cam to rotate; the cambered surfaces uniformly distributed on the side wall of the synchronous cam push the series of contacts to move synchronously toward radially outward, the diameter of the pitch circle formed on the outer side of the series of contacts increases, and the series of contacts may be fixed at specific positions.

During resetting of the rotary cylinder, the spring presses the shaft end surfaces of the contacts, so that the inner ends of the contacts are always in contact with the synchronous cam, and the series of contacts move synchronously toward radially inward.

The second servo motor, the first ball screw and the first linear guide rail are mounted on the second sliding frame; the output shaft of the second servo motor is connected to the first ball screw; the first sliding frame is connected with the first linear guide rail through the first guide rail sliding seat; the first sliding frame is connected to the first ball screw through the first lead screw nut, wherein the first lead screw nut meshes with the first ball screw; and through meshing of the first lead screw nut and the first ball screw, the number of revolutions and the steering of the second servo motor is controlled, and the first sliding frame may be controlled to move up and down along the first linear guide rail. The probe is mounted on the first sliding frame through the probe holder.

The third servo motor, the second ball screw and the second linear guide rail are mounted on the suspension; the output shaft of the third servo motor is connected to the second ball screw; the second sliding frame is connected to the second linear guide rail through the second guide rail sliding seat; the second sliding frame is connected to the second ball screw through the second lead screw nut, wherein the second lead screw nut meshes with the second ball screw; and through meshing of the second lead screw nut and the second ball screw, the number of revolutions and the steering of the third servo motor are controlled, and the second sliding frame may be controlled to move horizontally along the second linear guide rail.

According to the requirements of brake space detection specified in the wheel product standards, a control system comprehensively controls the steering and the number of revolutions of the second servo motor and the third servo motor through a pre-written running program to control the probe to move linearly along the wheel brake detection space.

In actual use, a wheel is transported directly above the device through a transport system, the series of contacts extend into a center hole of the wheel, through the second bearing and the shaft, the rotary cylinder may drive the synchronous cam to rotate, the cambered surfaces uniformly distributed on the side wall of the synchronous cam push the series of contacts to move synchronously toward radially outward, the series of contacts finally tighten the center hole of the wheel, the rotary cylinder fixes the synchronous cam and the series of contacts in this state, and the positioning of the wheel is completed. According to the requirements of the wheel detection space, a wheel assembly space detecting program is pre-written, the control system of the device comprehensively controls the steering and the number of revolutions of the second servo motor and the third servo motor through the pre-input space detecting program to control the probe to move linearly along the wheel assembly space, the probe synchronously feeds back the distance information between the wheels to an analysis system of the device, and the analysis system compares the acquired information with the requirements of the wheel product standards, and determines whether the assembly space of the wheel is qualified. So far, the assembly space detection of the wheel is completed.

The present application may meet the requirements of precise detection of the wheel brake space, has the characteristics of simple structure, convenient manufacture, stable performance, high positioning precision, simple operation and the like, and therefore is very suitable for automatic batch production.

Figure 1:
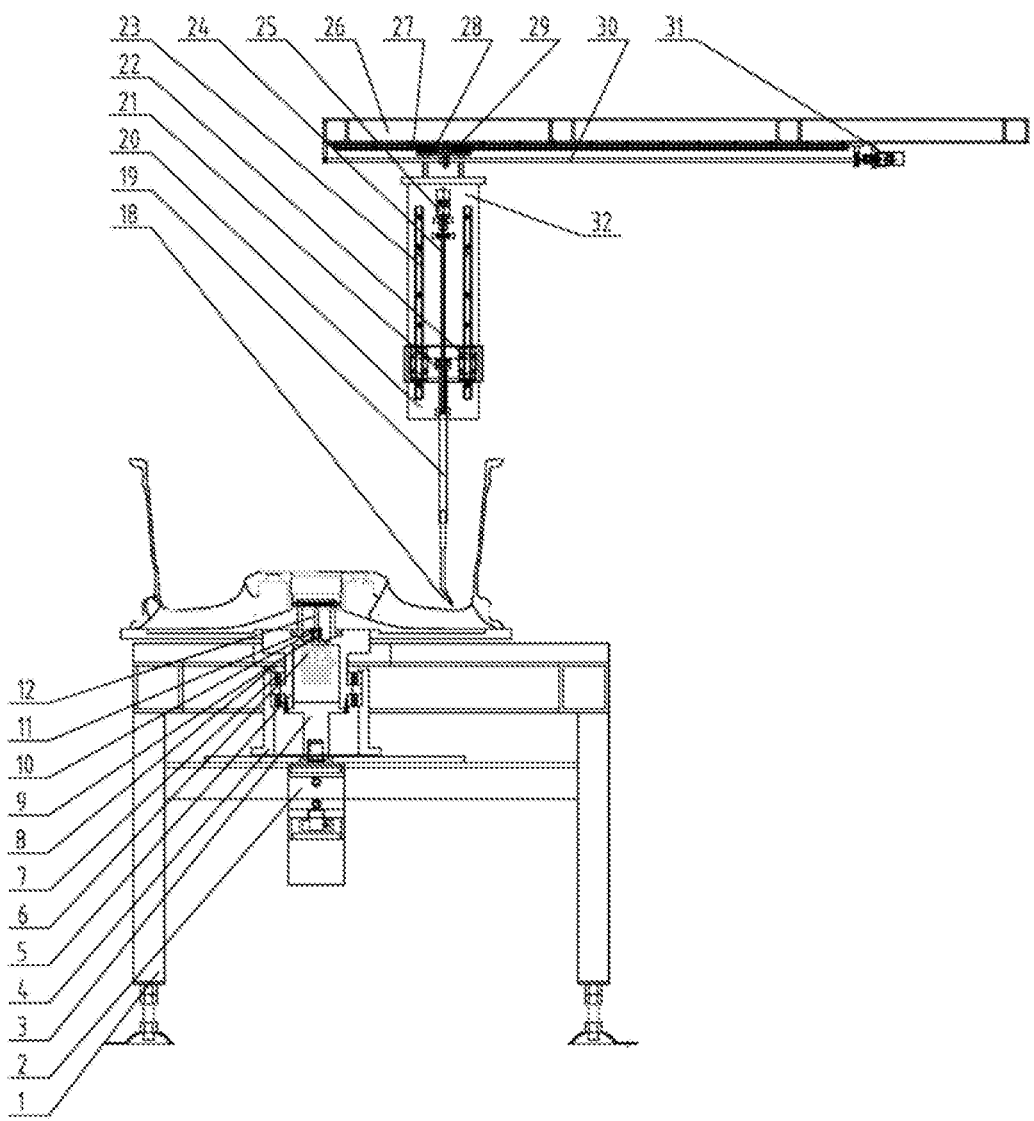
FIG. 1 is a structure diagram of a wheel brake space detecting device according to the present application.
Figure 2:
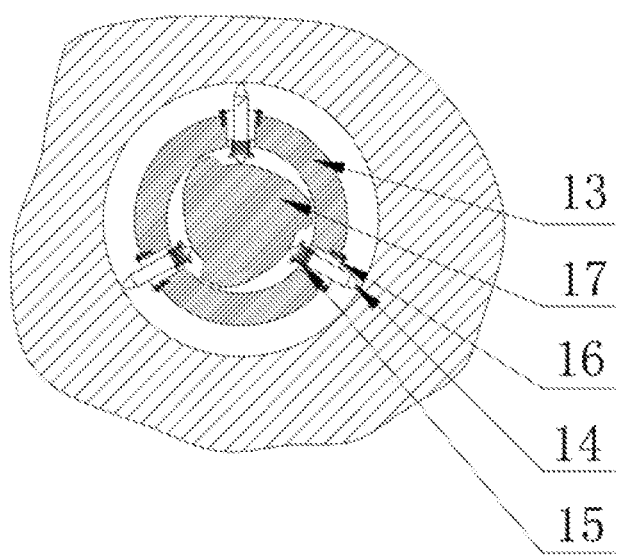
FIG. 2 is a schematic diagram of a positioning portion of the wheel brake space detecting device according to the present application.

In figures: 1—frame, 2—first servo motor, 3—connecting shaft, 4—pedestal, 5—rotating shaft, 6—rotary cylinder, 7—first bearing, 8—first bearing end cap, 9—base, 10—second bearing, 11—second bearing end cap, 12—shaft, 13—shaft sleeve, 14—contact, 15—spring, 16—linear bearing, 17—synchronous cam, 18—probe, 19—probe holder, 20—first sliding frame, 21—first lead screw nut, 22—first guide rail sliding seat, 23—first linear guide rail, 24—first ball screw, 25—second servo motor, 26—suspension, 27—second linear guide rail, 28—second guide rail sliding seat, 29—second lead screw nut, 30—second ball screw, 31—third servo motor, 32—second sliding frame.

DETAILED DESCRIPTION OF THE INVENTION

The details and working conditions of the specific device according to the present application are described in detail below in combination with the drawings.

The present application relates to a wheel brake space detecting device, comprising a frame 1, a first servo motor 2, a connecting shaft 3, a pedestal 4, a rotating shaft 5, a rotary cylinder 6, a first bearing 7, a first bearing end cap 8, a base 9, a second bearing 10, a second bearing end cap 11, a shaft 12, a shaft sleeve 13, contacts 14, a spring 15, linear bearings 16, a synchronous cam 17, a probe 18, a probe holder 19, a first sliding frame 20, a first lead screw nut 21, a first guide rail sliding seat 22, a first linear guide rail 23, a first ball screw 24, a second servo motor 25, a suspension 26, a second linear guide rail 27, a second guide rail sliding seat, a second lead screw nut 29, a second ball screw 30, a third servo motor 31, and a second sliding frame 32.

The first servo motor 2 and the pedestal 4 are mounted on the frame 1; the rotating shaft 5 is connected to an output shaft of the first servo motor 2 through the connecting shaft 3; the rotary cylinder 6, the shaft sleeve 13 and the base 9 are mounted on the rotating shaft 5; the second bearing end cap 11 encloses the second bearing 10 and the shaft 12 in the base 9, and two ends of the shaft 12 are respectively connected with an output shaft of the rotary cylinder 6 and the synchronous cam 17; the three or more linear bearings 16 are mounted on the side wall of the shaft sleeve 13 in a uniformly distributed way; the side wall of the synchronous cam 17 has three or more uniform-distributed cambered surfaces; the outer ends of the three or more contacts 14 pass through the spring 15 and the linear bearings 16, and the inner ends are respectively connected with the same amount of corresponding cambered surfaces of the high-precision synchronous cam 17; two ends of the spring 15 are respectively in contact with the linear bearings 16 and the shaft end surfaces of the contacts 14; the spring 15 always has elasticity, so that the inner ends of the contacts 14 always compress the synchronous cam 17; and the rotating shaft 5 is mounted on the pedestal 4 through the first bearing 7 and the first bearing end cap 8.

The first servo motor 2 drives the rotating shaft 5 to rotate with high precision through the first bearing 7.

The rotary cylinder 6, through the second bearing 10 and the shaft 12, may drive the synchronous cam 17 to rotate; the cambered surfaces uniformly distributed on the side wall of the synchronous cam 17 push the series of contacts 14 to move synchronously toward radially outward, the diameter of the pitch circle formed on the outer side of the series of contacts 14 increases, and the series of contacts 14 may be fixed at specific positions.

During resetting of the rotary cylinder 6, the spring 15 presses the shaft end surfaces of the contacts 14, so that the inner ends of the contacts 14 are always in contact with the synchronous cam 17, and the series of contacts 14 move synchronously toward radially inward.

The second servo motor 25, the first ball screw 24 and the first linear guide rail 23 are mounted on the second sliding frame 32; the output shaft of the second servo motor 25 is connected to the first ball screw 24; the first sliding frame 20 is connected with the first linear guide rail 23 through the first guide rail sliding seat 22; the first sliding frame 20 is connected to the first ball screw 24 through the first lead screw nut 21, wherein the first lead screw nut 21 meshes with the first ball screw 24; and through meshing of the first lead screw nut 21 and the first ball screw 24, the number of revolutions and the steering of the second servo motor 25 is controlled, and the first sliding frame 20 may be controlled to move up and down along the first linear guide rail 23. The probe 18 is mounted on the first sliding frame 20 through the probe holder 19.

The third servo motor 31, the second ball screw 30 and the second linear guide rail 27 are mounted on the suspension 26; the output shaft of the third servo motor 31 is connected to the second ball screw 30; the second sliding frame 32 is connected to the second linear guide rail 27 through the second guide rail sliding seat; the second sliding frame 32 is connected to the second ball screw 30 through the second lead screw nut 29, wherein the second lead screw nut 29 meshes with the second ball screw 30; and through meshing of the second lead screw nut 29 and the second ball screw 30, the number of revolutions and the steering of the third servo motor 31 are controlled, and the second sliding frame 32 may be controlled to move horizontally along the second linear guide rail 27.

According to the requirements of brake space detection specified in the wheel product standards, a control system comprehensively controls the steering and the number of revolutions of the second servo motor 25 and the third servo motor 31 through a pre-written running program to control the probe 18 to move linearly along the wheel brake detection space.

In actual use, a wheel is transported directly above the device through a transport system, the series of contacts 14 extend into a center hole of the wheel, through the second bearing 10 and the shaft 12, the rotary cylinder 6 may drive the synchronous cam 17 to rotate, the cambered surfaces uniformly distributed on the side wall of the synchronous cam 17 push the series of contacts 14 to move synchronously toward radially outward, the series of contacts 14 finally tighten the center hole of the wheel, the rotary cylinder 6 fixes the synchronous cam 17 and the series of contacts 14 in this state, and the positioning of the wheel is completed. According to the requirements of the wheel detection space, a wheel assembly space detecting program is pre-written, the control system of the device comprehensively controls the steering and the number of revolutions of the second servo motor 25 and the third servo motor 31 through the pre-input space detecting program to control the probe 18 to move linearly along the wheel assembly space, the probe 18 synchronously feeds back the distance information between the wheels to an analysis system of the device, and the analysis system compares the acquired information with the requirements of the wheel product standards, and determines whether the assembly space of the wheel is qualified. So far, the assembly space detection of the wheel is completed.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel brake space detecting device, comprising a frame, a first servo motor, a connecting shaft, a pedestal, a rotating shaft, a rotary cylinder, a first bearing, a first bearing end cap, a base, a second bearing, a second bearing end cap, a shaft, a shaft sleeve, contacts, a spring, linear bearings, a synchronous cam, a probe, a probe holder, a first sliding frame, a first lead screw nut, a first guide rail sliding seat, a first linear guide rail, a first ball screw, a second servo motor, a suspension, a second linear guide rail, a second guide rail sliding seat, a second lead screw nut, a second ball screw, a third servo motor, and a second sliding frame; wherein, the first servo motor and the pedestal are mounted on the frame; the rotating shaft is connected to an output shaft of the first servo motor through the connecting shaft; the rotary cylinder, the shaft sleeve and the base are mounted on the rotating shaft; the second bearing end cap encloses the second bearing and the shaft in the base, and two ends of the shaft are respectively connected with an output shaft of the rotary cylinder and the synchronous cam; the three or more linear bearings are mounted on the side wall of the shaft sleeve in a uniformly distributed way; the side wall of the synchronous cam has three or more uniform-distributed cambered surfaces; the outer ends of the three or more contacts respectively pass through the spring and the linear bearings, and the inner ends are respectively connected with the same amount of corresponding cambered surfaces of the high-precision synchronous cam; two ends of the spring are respectively in contact with the linear bearings and the shaft end surfaces of the contacts; the spring always has elasticity, so that the inner ends of the contacts always compress the synchronous cam; and the rotating shaft is mounted on the pedestal through the first bearing and the first bearing end cap;

the second servo motor, the first ball screw and the first linear guide rail are mounted on the second sliding frame; the output shaft of the second servo motor is connected to the first ball screw; the first sliding frame is connected with the first linear guide rail through the first guide rail sliding seat; the first sliding frame is connected to the first ball screw through the first lead screw nut, wherein the first lead screw nut meshes with the first ball screw; and through meshing of the first lead screw nut and the first ball screw, the number of revolutions and the steering of the second servo motor is controlled, and the first sliding frame is configured to be controlled to move up and down along the first linear guide rail; the probe is mounted on the first sliding frame through the probe holder;

the third servo motor, the second ball screw and the second linear guide rail are mounted on the suspension; the output shaft of the third servo motor is connected to the second ball screw; the second sliding frame is connected to the second linear guide rail through the second guide rail sliding seat; the second sliding frame is connected to the second ball screw through the second lead screw nut, wherein the second lead screw nut meshes with the second ball screw; and through meshing of the second lead screw nut and the second ball screw, the number of revolutions and the steering of the third servo motor are controlled, and the second sliding frame is configured to be controlled to move horizontally along the second linear guide rail.

2. The wheel brake space detecting device according to claim 1, wherein the first servo motor drives the rotating shaft to rotate with high precision through the first bearing.

3. The wheel brake space detecting device according to claim 1, wherein the rotary cylinder, through the second bearing and the shaft, is configured to drive the synchronous cam to rotate; the cambered surfaces uniformly distributed on the side wall of the synchronous cam push the series of contacts to move synchronously toward radially outward, the diameter of the pitch circle formed on the outer side of the series of contacts increases, and the series of contacts are configured to be fixed at specific positions.

4. The wheel brake space detecting device according to claim 1, wherein during resetting of the rotary cylinder, the spring presses the shaft end surfaces of the contacts, so that the inner ends of the contacts are always in contact with the synchronous cam, and the series of contacts move synchronously toward radially inward.

* * * * *